(12) United States Patent
Zhou

(10) Patent No.: US 12,078,974 B2
(45) Date of Patent: Sep. 3, 2024

(54) METHOD, APPARATUS, COMPUTER DEVICE AND STORAGE MEDIUM FOR CONTROLLING A COOKING DEVICE

(71) Applicant: Wenle Zhou, Shenzhen (CN)

(72) Inventor: Chuanwei Zhou, Foshan (CN)

(73) Assignee: Wenle Zhou, Shenzhen (CN)

( * ) Notice: Subject to any disclaimer, the term of this patent is extended or adjusted under 35 U.S.C. 154(b) by 1003 days.

(21) Appl. No.: 16/758,568

(22) PCT Filed: Aug. 31, 2018

(86) PCT No.: PCT/CN2018/103615
§ 371 (c)(1),
(2) Date: Apr. 23, 2020

(87) PCT Pub. No.: WO2019/080650
PCT Pub. Date: May 2, 2019

(65) Prior Publication Data
US 2020/0348638 A1    Nov. 5, 2020

(30) Foreign Application Priority Data

Oct. 24, 2017 (CN) .......................... 201711002555.X
Oct. 24, 2017 (CN) .......................... 201721389652.4

(51) Int. Cl.
*G05B 19/042* (2006.01)
*G06K 7/14* (2006.01)
*H05B 6/64* (2006.01)

(52) U.S. Cl.
CPC ......... *G05B 19/042* (2013.01); *G06K 7/1413* (2013.01); *G06K 7/1417* (2013.01); *H05B 6/6441* (2013.01); *G05B 2219/2643* (2013.01)

(58) Field of Classification Search
CPC .. G05B 19/042; G06K 7/1413; G06K 7/1417; H05B 6/6441

(Continued)

(56) References Cited

U.S. PATENT DOCUMENTS

2002/0157411 A1* 10/2002 Ishikawa ............... F25D 29/005
                                                                62/331
2004/0011210 A1    1/2004 Lee et al.
(Continued)

FOREIGN PATENT DOCUMENTS

CN    101668992 A    3/2010
CN    104580290 A    4/2015
(Continued)

OTHER PUBLICATIONS

B. Yüksel, "Automatic food recognition and automatic cooking termination by texture analysis method in camera mounted oven," 2014 22nd Signal Processing and Communications Applications Conference (SIU), Trabzon, Turkey, 2014, pp. 1987-1990, doi: 10.1109/SIU.2014.6830647. (Abstract in English) (Year: 2014).*

(Continued)

*Primary Examiner* — Mohammad Ali
*Assistant Examiner* — Joshua T Sanders
(74) *Attorney, Agent, or Firm* — Dorsey & Whitney LLP

(57) ABSTRACT

The present application relates to a method, apparatus, computer device and storage medium for controlling a cooking device. The method includes: scanning a coded pattern preset on a to-be-cooked food to obtain to-be-cooked food information characterizing the to-be-cooked food; sending a standby instruction to the cooking device when the to-be-cooked food information meets a preset standby condition, so as to bring the cooking device into a standby state; sending a cooking instruction to the cooking device when the cooking device is in the standby state and the preset cooking condition is met, so as to control the cooking device to cook the to-be-cooked food; and receiving state information fed back by the cooking device, wherein the state information is configured to characterize the cooking state of the cooking device.

15 Claims, 3 Drawing Sheets

(58) Field of Classification Search
USPC .......................................................... 700/28
See application file for complete search history.

(56) References Cited

U.S. PATENT DOCUMENTS

| | | | | |
|---|---|---|---|---|
| 2005/0015348 A1* | 1/2005 | Knepler | ................. | G06Q 50/06 |
| | | | | 705/76 |
| 2008/0141868 A1* | 6/2008 | Cook | .................... | A47J 37/045 |
| | | | | 426/233 |
| 2008/0236562 A1* | 10/2008 | Sager | ........................ | F24C 7/08 |
| | | | | 455/41.3 |
| 2016/0242455 A1 | 8/2016 | Evans et al. | | |
| 2016/0363921 A1* | 12/2016 | Martindale | ............ | G06Q 50/12 |

FOREIGN PATENT DOCUMENTS

| | | | | |
|---|---|---|---|---|
| CN | 106264070 A | | 1/2017 | |
| CN | 106326960 A | | 1/2017 | |
| CN | 207198614 U | | 4/2018 | |
| CN | 108388151 A | | 8/2018 | |
| GB | 2206425 A | * | 1/1989 | ........... H05B 6/6458 |
| JP | 2005006282 A | * | 1/2005 | |

OTHER PUBLICATIONS

International Search Report from International Application No. PCT/CN2018/103615 mailed Nov. 16, 2018.
European Search Report for EP Application No. 18870999.2 mailed Jan. 31, 2020.

* cited by examiner

METHOD, APPARATUS, COMPUTER DEVICE AND STORAGE MEDIUM FOR CONTROLLING A COOKING DEVICE

CROSS-REFERENCE TO RELATED APPLICATIONS

The present application is a U.S. National Stage of International Application No. PCT/CN2018/103615 filed on Aug. 31, 2018, which claims priority to Chinese Patent Application No. 201711002555.X, filed on Oct. 24, 2017 and entitled "COOKING APPARATUS CONTROL METHOD AND DEVICE, COMPUTER DEVICE AND STORAGE MEDIUM", and to Chinese Patent Application No. 201721389652.4, filed on Oct. 24, 2017 and entitled "APPARATUS FOR CONTROLLING COOKING DEVICE." The entire contents of the foregoing applications are incorporated herein by reference.

TECHNICAL FIELD

The present disclosure relates to the field of technologies for controlling an intelligent device, and in particular to a method, apparatus, computer device and storage medium for controlling a cooking device.

BACKGROUND

With the continuous development of Internet of Things technology, more and more intelligent devices, such as intelligent coffee machines, intelligent microwave ovens and other intelligent cooking devices, have been introduced into people's daily lives. Internet of things (IoT), as literally said, refers to an Internet that everything is interconnected. Specifically, Internet of things refers to a huge network formed by the combination of Internet and any information, required for objects or processes to be monitored, connected, interacted or the like, acquired in real time by various information sensor devices. The objective thereof is to achieve connections of objects to objects, objects to persons and all objects to network, to facilitate the identification, management and control.

Intelligent cooking device is a typical application of Internet of things for daily life, which is capable of effectively improving people's life quality with functions such as remote control, touch switch control, automatic alarm, automatic timing and the like. However, the conventional cooking device control method still relies on manual operations to the significant extend, and it is necessary to assist an operation manually near the cooking device. The operations are complicated and the intelligence degree is low, which greatly affects the operation efficiency of cooking devices.

SUMMARY

In view of above, provided is a method, apparatus, computer device and storage medium for controlling the cooking device, which is easy to operate and can effectively improve the working efficiency of devices.

The present disclosure provides a method for controlling a cooking device, including:
scanning a coded pattern preset on a to-be-cooked food to obtain to-be-cooked food information characterizing the to-be-cooked food;
sending a standby instruction to the cooking device when the to-be-cooked food information meets a preset standby condition, so as to bring the cooking device into a standby state;
sending a cooking instruction to the cooking device when the cooking device is in the standby state and the preset cooking condition is met, so as to control the cooking device to cook the to-be-cooked food; and
receiving state information fed back by the cooking device, wherein the state information is configured to characterize the cooking state of the cooking device.

In an embodiment, the step of sending the standby instruction to the cooking device when the to-be-cooked food information meets the preset standby condition, so as to bring the cooking device into the standby state, includes:
extracting time information of the to-be-cooked food from the to-be-cooked food information, wherein the time information comprises production time and shelf life;
triggering generation of the standby instruction when it is determined according to the time information that the to-be-cooked food has not expired; and
sending the standby instruction to the cooking device, so as to bring the cooking device into the standby state.

In an embodiment, the step of sending the standby instruction to the cooking device, so as to bring the cooking device into the standby state, further includes:
prohibiting sending the standby instruction to the cooking device when a record of the standby instruction corresponding to the coded pattern sent to the cooking device exists in a history record.

In an embodiment, the step of sending the cooking instruction to the cooking device when the cooking device is in the standby state and the preset cooking condition is met, so as to control the cooking device to cook the to-be-cooked food, includes:
receiving an external cooking control signal to trigger generation of the cooking instruction, wherein the cooking instruction comprises a number of times of available cooking and an operable duration corresponding to the to-be-cooked food;
obtaining a cooking record list of the to-be-cooked food, wherein the cooking record list comprises a historical cooking time of the to-be-cooked food;
obtaining a number of times of historical cooking and an operable time according to the operable duration and the historical cooking time; and
sending the cooking instruction to the cooking device when the number of times of historical cooking is less than the number of times of available cooking, and the present time does not exceed the operable time, so as to control the cooking device to cook the to-be-cooked food.

In an embodiment, after the step of scanning the coded pattern preset on the to-be-cooked food to obtain the to-be-cooked food information characterizing the to-be-cooked food, it includes:
recording a scanning time for scanning the coded pattern of the to-be-cooked food;
extracting time information of the to-be-cooked food from the to-be-cooked food information, wherein the time information comprises production time and shelf life; and
comparing the scanning time with the time information, and sending out a food expiration warning message when the to-be-cooked food has expired.

In an embodiment, after the step of receiving the state information fed back by the cooking device, wherein the state information is configured to characterize the cooking state of the cooking device, it further includes:
performing statistics for the state information to statistical information, wherein the statistical information comprises operation statistical information of the cooking device and cooking statistical information of the to-be-cooked food.

The present disclosure further provides an apparatus for controlling a cooking device, including:

a food scanning module configured to scan a coded pattern preset on a to-be-cooked food, to obtain to-be-cooked food information characterizing the to-be-cooked food;

a standby instruction module configured to send a standby instruction to the cooking device when the to-be-cooked food information meets a preset standby condition, so as to bring the cooking device into a standby state;

a cooking instruction module configured to send a cooking instruction to the cooking device when the cooking device is in the standby state and the preset cooking condition is met, so as to control the cooking device to cook the to-be-cooked food; and a state information module configured to receive state information fed back by the cooking device, wherein the state information is configured to characterize the cooking state of the cooking device.

In an embodiment, the standby instruction module includes:

a time information extracting unit configured to extract time information of the to-be-cooked food from the to-be-cooked food information, wherein the time information comprises production time and shelf life;

a standby instruction generating unit configured to trigger generation of the standby instruction when it is determined according to the time information that the to-be-cooked food has not expired; and a standby instruction sending unit configured to send the standby instruction to the cooking device, so as to bring the cooking device into the standby state.

The present disclosure further provides an apparatus for controlling a cooking device, including:

a food scanning module configured to scan a coded pattern preset on a to-be-cooked food, to obtain to-be-cooked food information characterizing the to-be-cooked food;

a processor module configured to receive the to-be-cooked food information and an external control signal, to output a control instruction according to the to-be-cooked food information and the external control signal; and a communication module configured to send the control instruction to the cooking device and receive state information fed back by the cooking device and configured to characterize a cooking state;

wherein the processor module is respectively connected to the food scanning module and the communication module.

In an embodiment, the control instruction includes the standby instruction configured to control the cooking device into the standby state and the cooking instruction configured to control the cooking device into the cooking state;

wherein the processor module is further configured to output the standby instruction when the to-be-cooked food information meets the preset standby condition, so as to control the cooking device into the standby state; and configured to output the cooking instruction when the cooking device is in the standby state and the preset cooking condition is met, so as to control the cooking device into the cooking state.

In an embodiment, the food scanning module includes at least one of a laser scanning module and a red light scanning module.

In an embodiment, the processor module includes:

an external control receiving module configured to receive the external control signal; and a working state control processor configured to receive the cooking food information and an output of the external control receiving module, and output a corresponding working state instruction;

wherein the working state control processor is respectively connected to the external control receiving module, the food scanning module and the communication module.

In an embodiment, the external control receiving module includes a switch circuit including at least one of a slide switch, a toggle switch, a snap switch, a button switch, a key switch, and a thin film switch.

In an embodiment, the working state control processor includes a single-chip microcomputer.

In an embodiment, the processor module further includes an alarm module, which is respectively connected to the external control receiving module, the working state control processor and the communication module.

In an embodiment, the communication module includes at least one of a twisted pair, a coaxial cable, an optical fiber, a Wi-Fi communication module, a Bluetooth communication module, a Zigbee communication module, a 3G communication module, a 4G communication module, and a 5G communication module.

In an embodiment, the apparatus for controlling the cooking device further includes a display, and the display is respectively connected to the food scanning module, the processor module and the communication module.

In an embodiment, the apparatus for controlling the cooking device further includes a power supply, and the power supply is respectively connected to the food scanning module, the processor module and the communication module.

The present disclosure further provides a computer readable storage medium having a computer program stored thereon, wherein when the computer program is executed by a processor. The processor performs the steps of the foregoing method.

The present disclosure further provides a computer device including a processor and a memory having a computer program stored therein, wherein when the computer program is executed by the processor, the processor performs the the steps of the foregoing method.

According to the above-mentioned method, apparatus, computer device and storage medium for controlling the cooking device, the food information configured to describe the food, such as production date, shelf-life, cooking methods or the like, is obtained by first scanning the coded pattern of the to-be-cooked food. When the preset standby condition is met, the standby instruction is sent, so as to bring the cooking device into the standby state, which may ensure that the cooking device is actuated timely to enter the standby state after the food is scanned, so as to be prepared for any cooking operation at all time. Then, when the preset cooking condition is met, the cooking instruction is sent, and the cooking device performs food cooking automatically according to the relevant preparation method. At last, the state information, returned from the cooking device and configured to describe the cooking state of the cooking device, is received, thereby realizing the control to the cooking device. The method, apparatus, computer device and storage medium for controlling the above-mentioned cooking device can control the cooking device conveniently and intelligently, so that the cooking device may intelligently complete any cooking operation without being manually assisted near the cooking device, thereby effectively improving the working efficiency of the cooking device.

BRIEF DESCRIPTION OF THE DRAWINGS

For the purpose of illustrating the technical solutions of the embodiments of the present disclosure or of the prior art more explicitly, the accompanying drawings to be used necessarily for the description of the embodiments or the prior art will be briefly described below. Apparently, the accompanying drawings described below are part of the embodiments of the disclosure only, accompanying drawings of the other embodiments may further be acquired based on these accompanying drawings herein without creative efforts to those of ordinary skill in the art.

DETAILED DESCRIPTION OF THE EMBODIMENTS

In order to make the objects, technical solutions and advantages of the present disclosure more comprehensible, the present disclosure will be described in detail below with reference to the accompanying drawings and embodiments. It should be understood that the detailed description of the embodiments described herein are merely illustrative of the application and are not intended to limit the scope of the application.

Figure 1:
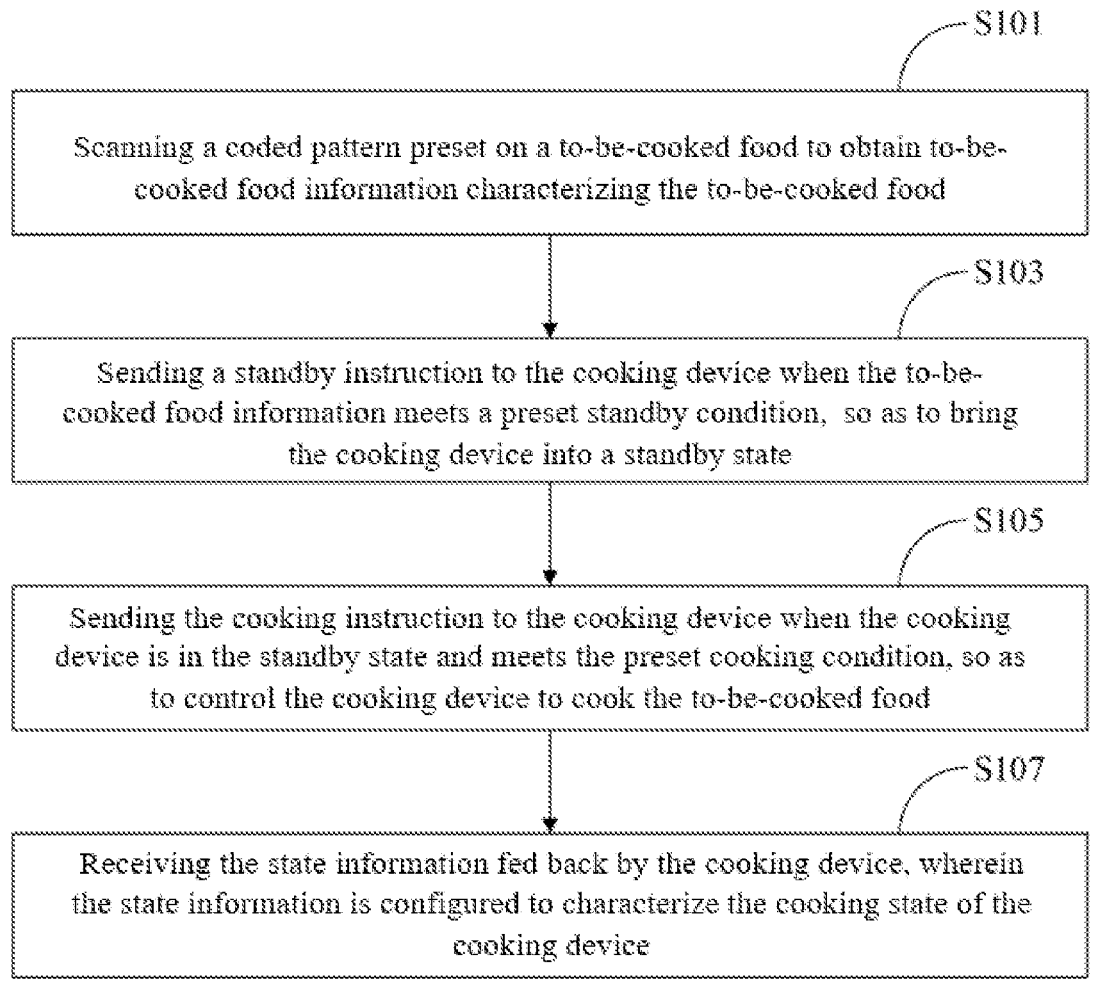
FIG. 1 is a flowchart of the method for controlling a cooking device according to an embodiment of the present disclosure.

FIG. 1 is a schematic flowchart of the method for controlling a cooking device according to an embodiment of the present disclosure. The method for controlling the cooking device may be performed by a control terminal, wherein the control terminal may be for example a mobile phone, a notebook, a tablet computer, a POS terminal (Point Of Sales Terminal), and even a terminal device with multiple application functions, including in-vehicle computer and the like. As shown in FIG. 1, the method for controlling the cooking device includes the following steps.

At step S101, a coded pattern preset on a to-be-cooked food is scanned to obtain to-be-cooked food information characterizing the to-be-cooked food.

The scanning may be performed with a scanner, a scanning spear or a scanning module included in the control terminal itself. The type of scanning may be laser scanning, red light scanning or the like.

The to-be-cooked food refers to the food needing to be cooked. Specifically, it may be raw food needing to be cooked, cooked food needing to be warmed, or food or beverage materials needing to be prepared.

The coded pattern refers to various coded patterns printed on food packaging bags. The coded pattern stores relevant information for describing the to-be-cooked food, such as origin, producer, production date, shelf life and other information, and may further include cooking methods, a number of times of available cooking, operable time and other information. The coded pattern may also store a link of the relevant information for describing the to-be-cooked food. In order to obtain the relevant food information, the link may be opened by scanning the coded pattern. In general, the coded pattern has uniqueness. Specifically, the coded pattern may be a bar code, a QR code or the like. In this embodiment, the coded pattern is a unique coded pattern corresponding to any to-be-cooked food, that is, each to-be-cooked food has a unique coded pattern.

A one-dimensional bar code, also known as a bar code, is a graphic identifier that expresses a set of information by arranging a plurality of black bars and white gaps, having different widths, according to a certain encoding rule. The bar code may store a lot of information, such as production country, producer, product name, production date, category, expiration date and the like.

A QR code, also known as a two-dimensional bar code, may be considered as an upgrade of the bar code. It is a graphic with interlaced black and white distributed on a plane (in a two-dimensional direction) in a certain rule using specific geometries. It is capable of "encoding" relative information, such as text, images, audios, videos and the like, into a graphic. Such information will be displayed, when shooting by using a specific software to scan the graphic. The to-be-cooked food information stored in the coded pattern is configured to characterize the to-be-cooked food. Specifically, it may include origin, producer, production date, shelf life, cooking methods or other information. The food information characterizing the to-be-cooked food may be obtained by scanning the coded pattern preset on the to-be-cooked food.

At step S103, a standby instruction is sent to the cooking device when the to-be-cooked food information meets a preset standby condition, so as to bring the cooking device into a standby state.

After the coded pattern of the to-be-cooked food is scanned, the obtained to-be-cooked food information may include origin, producer, production date, shelf life, cooking methods and other information of the to-be-cooked food. The preset standby condition, for example, that the to-be-cooked food is still in the shelf life, that is, has not expired yet, may be configured by the user himself. According to the obtained to-be-cooked food information by scanning, it is determined whether the to-be-cooked food meets the preset standby condition. For example, it is determined whether it has expired according to the production date and the shelf life. If it has not expired, the standby condition is then met, which may trigger generation of a standby instruction.

Further, after the coded pattern of the to-be-cooked food is scanned and if the to-be-cooked food information meets the preset standby condition, it may be so configured that the generation of the standby instruction is triggered immediately, so as to bring the cooking device into the standby state. It may also be so configured that a command for sending the standby instruction is triggered in a preset time threshold. For example, after the coded pattern of the to-be-cooked food is scanned, the standby instruction is sent in ten minutes to the cooking device, so as to bring the cooking device into the standby state.

The cooking device may be a general household cooking device such as oven, steamer oven, microwave oven, electric steamer, electric rice cooker or the like, or may also be a preparation device such as coffee machine, blender, juicer, tea maker or the like, or may also be a comprehensive food processing machine. For example, it may process not only food but also beverages. The cooking device may include a communications device, such as a WIFI communication module, a Bluetooth communication module, a 3G communication module, a 4G communication module, or a 5G communication module. The control instruction sent by the control terminal may be received and corresponding operations may be performed, by using the communication apparatus.

Further, the control instruction of the control terminal may be transferred directly via the communication apparatus on the cooking device, or may be relayed by the server to realize the transfer. For example, the control terminal first sends the control instruction to the server, and the server relays the control instruction to the cooking device for a corresponding operation. The control instruction of the control terminal may include a standby instruction.

The standby state refers to the state in which the cooking device is powered on but does not perform any substantive work. When the cooking device is in the standby state, it may work at any time in response to the working instruction sent by the control terminal. The standby instruction is a command sent by the control terminal, so as to control the cooking device to enter the standby state. The standby instruction may be received by the communication apparatus of the cooking device. After parsing, the cooking device is controlled to power on and enter the standby state, waits for the control terminal to deliver the working instruction at all time, and responses thereto to execute the corresponding operation.

When the to-be-cooked food information meets the preset standby condition, the standby instruction is sent to the cooking device, so as to bring the cooking device into the standby state. The information obtained by scanning may be timely written into the cooking device, and the cooking device enters the standby state, so that any working instruction delivered by the control terminal can be responded at all time, improving the working efficiency of the cooking device.

At step S105, the cooking instruction is sent to the cooking device when the cooking device is in the standby state and meets the preset cooking condition, so as to control the cooking device to cook the to-be-cooked food.

The preset cooking condition may be configured by the user. For example, when the present time reaches the preset cooking time, or a relevant button is clicked directly via the control terminal, that is, after sending the cooking control signal by the control terminal, it is triggered to generate the cooking instruction, which may be considered as having met the cooking condition. When the cooking device is in the standby state and the preset cooking condition is met, if the preset cooking time has been reached or the relevant button has been directly clicked by the control terminal, the cooking instruction is generated, and the cooking instruction is sent to the cooking device, so as to control the cooking device to enter the cooking working state, thereby realizing the cooking operation to the to-be-cooked food.

Further, the control instruction of the control terminal may include the cooking instruction. That is, the cooking instruction may be transferred directly via the communication apparatus on the cooking device, or may be relayed via the server. For example, the control terminal sends the cooking instruction first to the server, and the server relays the cooking instruction to the cooking device to perform the corresponding cooking operation.

The cooking instruction may include cooking parameters, such as cooking mode, cooking flame mode, cooking duration and the like. Specifically, the cooking mode may include cooking operations such as deep-frying, boiling, stir-frying, frying, stewing, braising and roasting, and may also include preparation operations such as brewing, soaking and stirring. Furthermore, the stir-frying may include raw stir-frying, ripe stir-frying, slick stir-frying, plain stir-frying, dry stir-frying, braising stir-frying, soft stir-frying, and the like. The deep-frying may include plain deep-frying, dry deep-frying, soft deep-frying, braising deep-frying, breadcrumb deep-frying, paper wrapping deep-frying, crispy deep-frying, oil drenching deep-frying and the like. The cooking instruction may also include a number of times of available cooking and an operable duration, corresponding to the food. The number of times of available cooking refers to the maximum number of times of cooking operations for the present food. For example, for a coffee capsule bag may be brewed by once, i.e. the number of cooking times is 1. The operable duration refers to the maximum time range within which the present food may be processed with all cooking operations in the cooking device. For example, a maximum number of times of available cooking of ribs is 3 times. If a soup decocting operation may be performed maximum by 3 times, and the operable duration is 10 hours, all soup decocting operations for ribs can only be finished within 10 hours. In the 10 hours, the soup decocting operation may be performed by once, twice or maximum 3 times. The cooking instruction includes specific cooking operation information. The cooking device performs a corresponding cooking operation according to the cooking operation information to implement cooking of the to-be-cooked food.

At step S107, the state information fed back by the cooking device is received, wherein the state information is configured to characterize the cooking state of the cooking device.

After the control terminal delivers the cooking instruction to the cooking device, so as to control the cooking device to cook the to-be-cooked food, the state information fed back by the cooking device may be received by the control terminal. The state information is configured to characterize the cooking state of the cooking device. For example, it may include information describing cooking progress, the to-be-cooked food, the cooking device, or the like. The cooking device may acquire the state information in real time during the cooking process, and send the state information feedback to the control terminal, so that the control terminal may know the working condition of the cooking device at all time. It is also possible to obtain the state information during the cooking process, and then feed back the acquired state information to the control terminal when the cooking ends or is interrupted, for example, after completion of the cooking or when the cooking process is interrupted due to occurring malfunction, in order to reduce the interaction between the control terminal and the cooking device. Alternatively, a feedback interval of the state information is set via the control terminal. For example, if the feedback interval of the state information is 3 minutes, the cooking device sends the acquired state information feedback to the control terminal every 3 minutes. The control terminal receives the state information fed back by the cooking device, so as to obtain the cooking state of the cooking device and know the working condition of the cooking device.

According to the method for controlling the cooking device, the to-be-cooked food information, such as production date, shelf-life or cooking methods, characterizing the to-be-cooked food is obtained by first scanning the coded pattern of the to-be-cooked food. When the preset standby condition is met, the standby instruction is sent, so as to bring the cooking device into the standby state, which may ensure that the cooking device enters timely the standby state after the to-be-cooked food is scanned, so as to be prepared for any cooking operation at all time. Then, when the preset cooking condition is met, the cooking instruction is sent, and the cooking device performs food cooking automatically according to the relevant preparation method. At last, the state information, returned from the cooking device and configured to describe the cooking state of the cooking device, is received, thereby realizing the control to the cooking device. The method for controlling the cooking device can control the cooking device conveniently and intelligently, so that the cooking device may intelligently complete any cooking operation without being manually assisted near the cooking device, thereby effectively improving the working efficiency of the cooking device.

Figure 2:
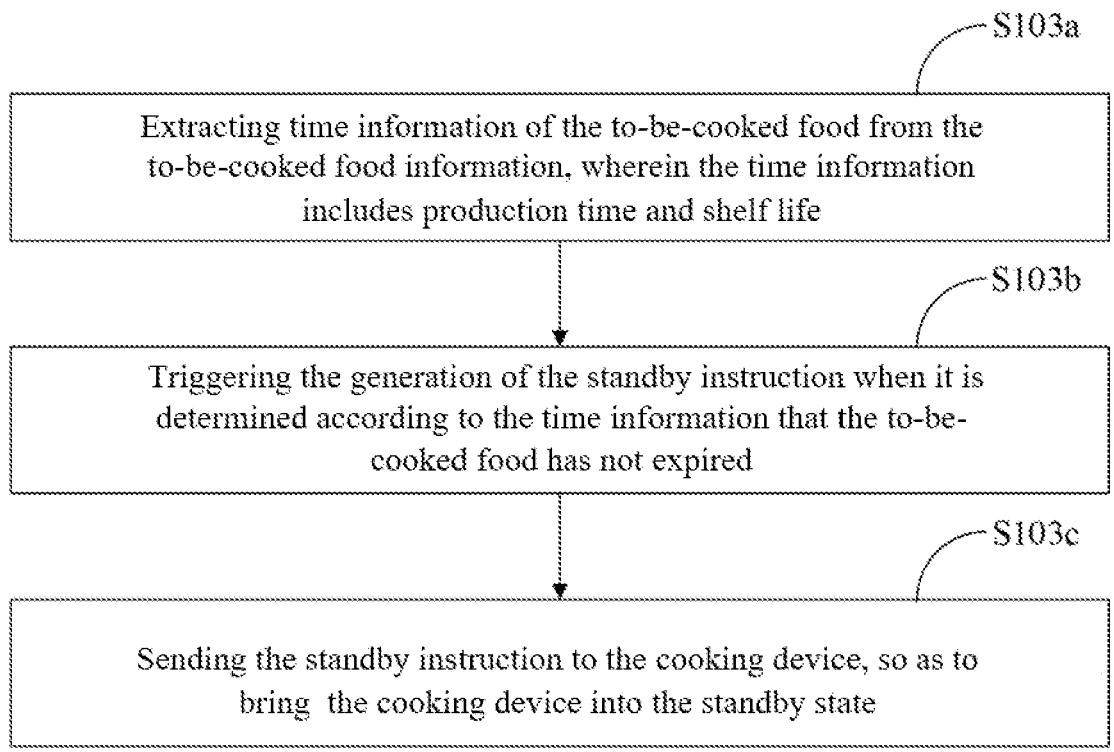
FIG. 2 is a schematic flowchart of steps that sends a standby instruction to a cooking device when the to-be-cooked food information meets a preset standby condition according to an embodiment of the method for controlling the cooking device according to the present disclosure.

Further, FIG. 2 is a schematic flowchart of step S103 according to an embodiment. As shown in FIG. 2, step S103 includes the following steps.

At step S103a, time information of the to-be-cooked food is extracted from the to-be-cooked food information, wherein the time information includes production time and shelf life.

The coded pattern of the to-be-cooked food stores the to-be-cooked food information or its link, and the to-be-cooked food information may be obtained by scanning the coded pattern. In practical applications, if the coded pattern is a bar code, by scanning the bar code, the information, such as the production place, producer, product name, production date, category and shelf life, of the to-be-cooked food may be obtained after decoding the bar code according to relevant decoding rules. If the coded pattern is a QR code, since the two-dimensional code may store information in both horizontal and vertical directions, it can store a plenty of information, such as Chinese characters, numbers, images, Web addresses and services. After scanning the QR code, it may display directly the to-be-cooked food information, or the link to the to-be-cooked food information and display the to-be-cooked food information on the relevant page opened via the link. The to-be-cooked food information includes the time information, such as food production time and shelf life, of the to-be-cooked food.

In practical applications, the coded pattern may be a bar code, which is a unique serial number corresponding to each to-be-cooked food or beverage material. The serial number is the unique corresponding number generated at the same time where the food is produced. In other words, the food information, such as production date and shelf life, of the food is linked to the serial number, by which it is possible to identify whether the food is in the shelf life, that is, whether the food has expired. The to-be-cooked food information may further include the information of the producer, the production place or the like. The information may be used for true-false determination. For example, the production country may be identified according to first three digits of the bar code, wherein 00-09 represent the United States, Canada, 45 and 49 represent Japan, 69 represents the mainland of China, 471 represents the Taiwan region of China and 489 represents the Hong Kong Special Administrative Region. The production country of the to-be-cooked food may be determined according to the first three digits, thereby realizing the effect of true-false identification.

At step S103b, the generation of the standby instruction is triggered, when it is determined according to the time information that the to-be-cooked food has not expired.

After the time information including production time, shelf life, or the like, is extracted from to-be-cooked food information, it is determined whether the to-be-cooked food has expired or not according to the time information. If it has not expired, the standby instruction is generated. The to-be-cooked food information includes production time and shelf-life of the food. In turn combining with the obtained present time, it may determine whether the food is still in the shelf-life or not by comparing the production time, shelf-life of the food with the present time.

In practical applications, the determination result whether it has expired may be indicated on the indication interface. For example, if the food is in the shelf-life, the interface will be displayed to indicate contents such as "The food has not expired, the shelf-life remains X days, may be edible safely". If the food has expired, the interface displayed indicates a content that "Food has expired, do not eat". At the same time, the generation of the standby instruction may be limited, that is, the generation of the standby instruction is prohibited, so that the control terminal cannot send the standby instruction to the cooking device, and alarm the operating user by displaying certain alarm information, such as vibration, ringing, or the like.

Further, after it is determined whether the to-be-cooked food has expired, the alert interface may be displayed only when the food has expired. Meanwhile, the alert information is displayed to prompt the operating user that the food has expired and is not edible. When the food is still in the shelf life, none operation will be performed, and the subsequent generating operation of the standby instruction is performed directly. When it is determined that the to-be-cooked food has not expired, the control terminal may generate an instruction by triggering the standby instruction, such as clicking the relevant operation button, to generate the standby instruction to control the relevant device to enter the standby state. Determining whether the food is in the shelf life according to the scanned to be cooked food information, may guarantee the freshness of the to-be-cooked food for each time, and ensure the food cooking safety.

At step S103c, the standby instruction is sent to the cooking device, so as to bring the cooking device into the standby state.

When the to-be-cooked food has not expired and after the standby instruction is generated, the standby instruction is sent to the cooking device to control the cooking device to enter the standby state. Specifically, the communication process of the control instruction, such as the standby instruction, may be implemented via the communication apparatus on the cooking device. The communication apparatus may be a WIFI communication module, a Bluetooth communication module, a 3G communication module, a 4G communication module, a 5G communication module, or the like. The control instruction sent by the control terminal may be received by the communication apparatus, and the corresponding operation may be executed by the communication apparatus. Further, the control instruction of the control terminal may realize transfer directly via the communication device on the cooking device. That is, the instruction is received directly by the communication device, or may be relayed via the server. For example, the mobile terminal sends the control instruction to the server, and the server relays the control instruction to the cooking device to perform the corresponding operation. After the cooking device enters the standby state, the to-be-cooked food information obtained by scanning may be written into the cooking device timely, so as to be capable of responding to the working instruction delivered by the control terminal at all time, and of improving the working efficiency of the cooking device.

Further, after the to-be-cooked food is scanned, when the to-be-cooked food information meets the preset standby condition, it may also be set to trigger the generation of the standby instruction within a preset time threshold, and send the standby instruction to the cooking device, so as to bring the cooking device into the standby state. Specifically, standby time for generating the standby instruction is recorded at the same time where the standby instruction is triggered. Scanning time for scanning the coded pattern of the to-be-cooked food is in turn obtained. When the difference between the standby time and the scanning time is less than the preset time threshold, the standby instruction is sent to the cooking device and brings the cooking device into the standby state.

Specifically, the scanning time of the scanning operation is recorded and stored after scanning the coded pattern of the to-be-cooked food by using a scanner, a scanning spear or a scanning module included in the controller. In practical applications, during scanning, a scanning time list may be created for each scanned coded pattern of to-be-cooked food. The scanning time list is configured to record the scanning time of scanning the food. Further, the scanning time may be recorded in sequence, while statistics for information, such as the number of scanning times and the intervals, may be performed. Obtaining the scanning time of scanning the coded pattern of the to-be-cooked food may be realized by obtaining the scanning time list of the to-be-cooked food first, and extracting in turn the relevant scanning time from the scanning time list. Further, when only one item is present in the scanning time list, that is, when the coded pattern of the food is scanned at the first time, the item is acquired directly as the scanning time. When multiple scanning time exist in the scanning time list, the item extracted from the scanning time list at the very beginning serves as the acquired scanning time. Further, a scanning time list editing function may be provided to access an editing interface or window through an editing portal. In the editing interface or window, the relevant scanning time may be deleted instantly. If the food that is not intended to be scanned for cooking is scanned in the event of a misoperation, the scanning time list editing function may be used to delete the relevant scanning time or the whole scanning time list, so as to avoid problems of the misoperation.

In an embodiment, after the standby time for generating the standby instruction and the scanning time for scanning the to-be-cooked food are obtained, the standby time and the scanning time are compared. When the difference between the standby time and the scanning time is less than the preset time threshold, the standby instruction is sent to the cooking device, so as to bring the cooking device into the standby state. A certain time interval between the operation of scanning the to-be-cooked food and the operation of actuating the cooking device to enter the standby state is present. It is compared whether the time difference between the standby time and the scanning time is within the preset time threshold, such as 10 minutes. If yes, the standby instruction is sent to the cooking device and brings the cooking device into the standby state. If not, the sending of the standby instruction is limited. By ensuring that the standby time and scanning time are within a certain time interval, the information of the to-be-cooked food obtained by scanning may be written into the cooking device timely, so as to bring the cooking device into the standby state, so as to respond to the working instruction delivered by the control terminal at all time, improving the operating efficiency of the cooking device.

It should be noted that in another embodiment, the standby instruction may be triggered instantly when it is determined that the to-be-cooked food information meets the preset standby condition, without waiting for the user to trigger the generation of the standby instruction at the control terminal.

Further, step S103 further includes prohibiting sending the standby instruction to the cooking device when a record of the standby instruction corresponding to the coded pattern sent to the cooking device exists in a history record. When the to-be-cooked food information meets the preset standby condition and the standby instruction is sent to the cooking device within the preset time threshold, it is possible to query whether the record of the standby instruction sent to the cooking device is present in the history record, so as to determine whether the standby instruction is already sent to the cooking device. That is, it is determined whether the sending of the standby instruction is the first time. If yes, the subsequent operation is performed, to send the standby instruction to the cooking device, so as to bring the cooking device into the standby state. If the standby instruction has been sent to the cooking device, that is, not the first time, sending the standby instruction is then prohibited.

The prohibiting against the sending of the standby instruction may be realized by disabling a standby instruction sending button, while the related prompt window interface may be displayed for prompting. Further, a standby instruction sending list may be created to record sending time in which the standby instruction is sent to the cooking device. The history records of the standby instruction sending list may be used to determine whether the standby instruction is sent to the cooking device for the first time. Generally, after the food is cooked, the coded pattern, such as bar code, will still exist on the food bag. If it is scanned and actuates the cooking device again, the food cooking operations is not able to be performed. Therefore, when the standby instruction is sent to the cooking device, a determination operation is performed to determine whether the standby instruction for the same coded pattern has been sent to the cooking device and actuates the cooking device to enter the standby state, thereby avoiding the problem that the cooking device is repeatedly actuated to enter the standby state due to repeated scanning of the coded pattern on the same package.

Further, step S105 may include receiving the external cooking control signal to trigger the generation of the cooking instruction, and the cooking instruction includes a number of times of available cooking and an operable duration corresponding to the to-be-cooked food.

In this embodiment, receiving the external cooking control signal may specifically refer to receiving the external cooking instruction generated when a cooking instruction button is clicked. The cooking instruction is a command sent by the control terminal to control the cooking device to perform the corresponding cooking operation, which may include a number of times of available cooking, an operable duration and other various cooking parameters, such as overall cooking mode, cooking mode, cooking flame mode, or the like. The number of times of available cooking refers to the maximum number of times by which the present food may be cooked. The operable duration refers to the maximum allowed time range for all cooking operations to the present food in the cooking device. The number of times of available cooking and the operable duration are related to the to-be-cooked food, and different foods correspond to different numbers of cooking times and operable time.

In practical applications, a food category can be identified after the to-be-cooked food information is obtained by scanning, and the number of times of available cooking and the operable duration corresponding to the food are further obtained from a pre-stored program according to the food category. Correspondingly, a memory is provided in the cooking device. Written and stored in the memory are types of the cooking instruction corresponding to each food category, such as the number of times of available cooking, the operable duration, and other cooking parameters corresponding to each food category, such as overall cooking mode, cooking mode, cooking flame mode, and the like. For example, the number of times of available cooking and the operable duration may also be further configured by the operating user himself. The number of times of available cooking and the operable duration may be set by the operating user according to personal preferences to satisfy different user needs.

Other cooking parameters, such as overall cooking mode, cooking mode, cooking flame mode, or the like, are various specific operations and duration of the operations for each time, such as brewing of beverages, cooking of food, and the like. Similarly, other various cooking parameters may be the corresponding cooking parameters automatically set by the system according to the to-be-cooked food category obtained by scanning according to the pre-stored program. For example, when the scanned to-be-cooked food is a coffee capsule, the system selects automatically the corresponding cooking time as 10 minutes to generate the corresponding cooking instructions. Similarly, for coffee powder is 15 minutes, for Longjing tea is 20 minutes, for Dahongpao tea is 25 minutes, and the like. The cooking instructions may be received by the communication apparatus of the cooking device. After parsing, the cooking device is controlled to perform the relevant cooking operations, such as deep-frying, boiling, stir-frying, frying, stewing, braising, roasting and the like, or preparation operations, such as brewing, soaking, stirring, and the like.

Further, the cooking instruction may extract the relevant cooking information from the to-be-cooked food information obtained by scanning, or may include selecting a pre-stored cooking mode in the cooking device, or may further include selecting the cooking operation by the operating user himself. Furthermore, the cooking operation mode configured by the operating user himself may be stored as a personalized cooking mode which may be selected to generate a corresponding cooking instruction in the subsequent cooking, so that the cooking device performs the corresponding cooking operation.

Further, step S105 may further include receiving the external cooking control signal to trigger the generation of the cooking instruction including the number of times of available cooking and the operable duration corresponding to the to-be-cooked food, and obtaining a cooking record list of the to-be-cooked food, wherein the cooking record list includes a historical cooking time of the to-be-cooked food.

After the cooking control signal sent from outside is received and the cooking instruction is generated, the cooking record list of the to-be-cooked food is obtained. Further, for each scanned to-be-cooked food, the cooking record list is created to record the historical cooking time corresponding to the to-be-cooked food. The historical cooking time refers to the cooking time corresponding to the to-be-cooked food in the history records, within which the cooking has been performed.

In practical applications, for the to-be-cooked food, by each time of sending the cooking instruction to control the cooking device to perform the cooking operation, the cooking time of the to-be-cooked food is recorded. For some kinds of foods, multiple cooking operations may be performed, or multiple progressive cooking needs to be performed. For example, when a tea maker uses a tea bag to make tea, multiple brewing may be performed. At this time, the record list includes the brewing time of the tea bag for each time, so that the number of brewing times and the time point of each brewing of the tea bag may be known timely.

Further, step S105 may further include receiving the external cooking control signal to trigger the generation of the cooking instruction including the number of times of available cooking and the operable duration corresponding to the to-be-cooked food, The cooking record list of the to-be-cooked food is obtained, wherein the cooking record list includes the historical cooking time of the to-be-cooked food. The number of times of historical cooking and the operable time are obtained according to the operable duration and the historical cooking time. When the number of times of historical cooking is less than the number of times of available cooking and the present time does not exceed the operable time, the cooking instruction is sent to the cooking device, so as to control the cooking device to cook the to-be-cooked food.

After the cooking record list of the to-be-cooked food is obtained and the historical cooking time is further obtained, the cooking time for the first time and the number of times of historical cooking corresponding to the food may be obtained according to the historical cooking time. The operable time may be obtained in turn according to the operable duration of the cooking instruction. The number of times of historical cooking is compared with the number of times of available cooking. The present time is compared with the operable time. When the number of times of historical cooking is less than the number of times of available cooking, and the current time does not exceed the operable time, the cooking instruction is sent to the cooking device, so as to control the cooking device.

The historical cooking time includes all the cooking records of the to-be-cooked food, from which the cooking time for the first time may be obtained. The operable time may be obtained according to the cooking time for the first time and the operable duration in the cooking instruction. For coffee powder, if the number of times of available cooking in the cooking instruction thereof is 2, the operable duration is 15 minutes, and when the cooking time for the first time recorded in the historical cooking time is 10 o'clock, the operable time is 15 minutes after the cooking time for the first time of 10 o'clock is actuated, i.e. a quarter past ten. For a to-be-cooked food, once a cooking operation has been performed, all the cooking operations need to be finished within the operable time, i.e. a time interval between the first and last cooking operations is required to be less than the operable duration. One or more cooking operations may be performed within the operable time.

The historical cooking time includes all the cooking records of the to-be-cooked food, from which the number of times of historical cooking of the food, that is, the number of times that the food has been cooked, may also be obtained. Considering that since most foods are suitable for one time of cooking or fewer times of cooking, the number of times of historical cooking corresponding to a to-becooked food in this embodiment may not exceed the number of times of available cooking in the cooking instructions, otherwise it is not possible to perform cooking again, so as to ensure the freshness of the food and guarantee the taste of the cooked food. For a tea brewing machine, after scanning a tea bag, the machine is actuated for the first time at 10:00 to perform the brewing operation. Assuming that the number of times of available cooking of the tea bag is 3 times, each time is 3 minutes, and the operable duration is 30 minutes, the tea is brewed for the first time until 10:03. The user sends a tea brewing instruction for the second time at 10:10 to brew the tea until 10:13. The user sends a tea brewing instruction for the third time at 10:25 to brew the tea until 10:28. Therefore, the machine will shut down automatically or will not function as soon as the time is at 10:30, since the operable duration of the tea bag is only 30 minutes, and the cooking time for the first time is 10:00, that is, the operable time is 10:30. In addition, even if the user brews the tea only twice in this 30 minutes, he cannot brew tea for the third time anymore. The machine is capable of being actuated again to operate, only when a new tea bag is scanned. On one hand, by comparing timely the number of times of historical cooking with the number of times of available cooking in the present cooking instruction, and on the other hand, by comparing the present time with the operable time in the present cooking instruction, the cooking process of the to-be-cooked food may be controlled. It is possible to make the time interval between the first and last cooking operations within a certain duration range when multiple cooking operations are performed, and the number of cooking times of the food may be controlled to ensure the freshness of the to-be-cooked food, and guarantee the taste of the cooked food.

Further, after step S101, it may include recording the scanning time of scanning the coded pattern of the to-be-cooked food. The scanning time of the scanning operation is recorded and stored after scanning the coded pattern of the to-be-cooked food by using a scanner, a scanning spear or a scanning module included in the control terminal. In practical applications, during scanning, a scanning time list may be created for each scanned coded pattern of to-be-cooked food. The scanning time list is configured to record the scanning time of scanning the food. Further, the scanning time may be recorded in sequence, while statistics for information, such as the number of scanning times and the intervals, may be performed.

Further, after step S101, it may include recording the scanning time of scanning the coded pattern of the to-be-cooked food. The time information of the to-be-cooked food is extracted from the to-be-cooked food information, where the time information includes production time and shelf life.

The coded pattern of the to-be-cooked food stores the to-be-cooked food information or its link, and the to-be-cooked food information may be obtained by scanning the coded pattern. In practical applications, if the coded pattern is a bar code, by scanning the bar code, the information, such as the production place, producer, product name, production date, category and shelf life, of the to-be-cooked food may be obtained after decoding the bar code according to relevant decoding rules. If the coded pattern is a QR code, since the two-dimensional code may store information in both horizontal and vertical directions, it can store a plenty of information, such as Chinese characters, numbers, images, Web addresses and services. After scanning the QR code, it may display directly the to-be-cooked food information, or the link to the to-be-cooked food information and display the to-be-cooked food information on the relevant page opened via the link. The to-be-cooked food information includes the time information, such as production time and shelf life of foods, of the to-be-cooked food.

Further, after step S101, it may include recording the scanning time of scanning the coded pattern of the to-be-cooked food. The time information of the to-be-cooked food is extracted from the to-be-cooked food information, wherein the time information includes production time and shelf life. The scanning time is compared with the time information. When the to-be-cooked food has expired, a food expiration warning message is sent out.

After the time information, including production time, shelf life and the like, is extracted from the to-be-cooked food information, it is determined according to this time information whether the to-be-cooked food has expired or not. The scanning time may include a present date of the scanning. Further, the to-be-cooked food information includes production time and shelf-life of the food. In turn combining with the obtained present time, it may determine whether the food is still in the shelf-life or not by comparing the production time, shelf-life of the food and the present time. In practical applications, the determination result whether it has expired may be indicated on the indication interface. For example, if the food is in the shelf-life, the interface will be displayed to indicate contents such as "The food has not expired, the shelf-life remains X days, may be edible safely". If the food has expired, the displayed interface indicates a food expiration warning message that "Food has expired, do not eat", and the food expiration warning message may be prompted by means of vibrating, ringing, or the like.

Further, after it is determined whether the to-be-cooked food has expired, the alert interface may be displayed only when the food has expired. Meanwhile, the food expiration warning message is sent to prompt the operating user that the food has expired and is not edible. When the food is still in the shelf life, none operation will be performed, and the subsequent generating operation of the standby instruction is performed directly. Determining whether the food is in the shelf life or not according to the scanned to-be-cooked food information, and sending the food expiration warning message when the food has expired, may avoid cooking expired foods, and ensure the safety of food cooking.

Further, after step S107, it may further include performing statistics for the state information to statistical information including operation statistical information of the cooking device and cooking statistical information of the to-be-cooked food.

After the control terminal sends out the cooking instruction to the cooking device, so as to control the cooking device to cook the to-be-cooked food, the control terminal may receive the state information, such as the cooking progress, the to-be-cooked food information, the cooking device information, or the like, sent from the cooking device and configured to describing the cooking state of the cooking device. After the state information sent by the cooking device is received, it is possible to perform the statistics for the state information to the statistical information, which may include the operation statistical information of the cooking device, the cooking statistical information of the to-be-cooked food, and the like.

In practical applications, the operation statistical information of the cooking device may include information, such as type of cooking operations performed by the cooking device, cooking time, cooking flame mode, cooking state, initial information, device information and present location of the cooking device. The statistical information of the to-be-cooked food may include the information such as the category of the food being cooked at present. Further, an evaluating function may further be added to evaluate the cooking mode and the category of the cooked food, for example, to rate the cooking mode and the taste of the cooked food with respect to a particular food category, for reference in the subsequent cooking. Further, the statistical information may be uploaded to the server where big data analysis is implemented, to obtain application situations of the various devices and various foods which are provided to device developers and food suppliers for reference. For example, it facilitates the aftersales following and the maintaining of the system when a malfunction of a certain device occurs, or it facilitates for the suppliers to increase investment when certain foods are sold better in some areas.

Further, it is possible to provide a function of posting comments and a function of online shopping links. Use situations of other operating users may be known with posted comments, and any desired cooking device or food or other articles may be purchased at any time via online shopping links.

Figure 3:
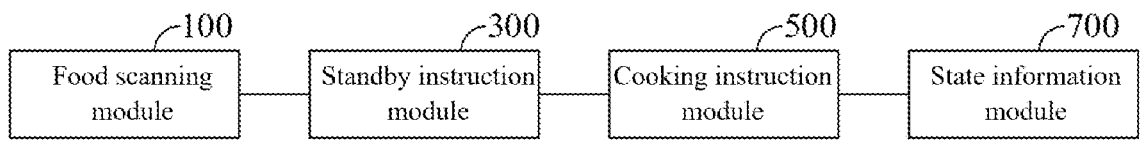
FIG. 3 is a structural schematic diagram according to an embodiment of the apparatus for controlling a cooking device according to the present disclosure.

In addition, corresponding to the method for controlling the cooking device, the present disclosure further provides an apparatus for controlling the cooking device. FIG. 3 is a structural schematic diagram according to an embodiment of the apparatus for controlling a cooking device according to the present disclosure. The apparatus for controlling the cooking device may be implemented by a terminal device such as mobile phone, notebook, tablet, POS machine, in-vehicle computer, or the like. As shown in FIG. 3, the apparatus for controlling the cooking device includes:

a food scanning module 100 configured to scan a coded pattern preset on a to-be-cooked food, to obtain to-be-cooked food information characterizing the to-be-cooked food;

a standby instruction module 300 configured to send a standby instruction to the cooking device when the to-be-cooked food information meets a preset standby condition, so as to bring the cooking device into a standby state;

a cooking instruction module 500 configured to send a cooking instruction to the cooking device when the cooking device is in the standby state and the preset cooking condition is met, so as to control the cooking device to cook the to-be-cooked food; and a state information module 700 configured to receive the state information fed back by the cooking device, wherein the state information is configured to characterize the cooking state of the cooking device.

The food scanning module includes at least one of a laser scanning module and a red light scanning module. The food scanning module may be a scanner, a scanning gun, or a scanning module carried by a terminal device. The food scanning module may be a scanner, a scanning spear, or a scanning module included in the terminal device.

Figure 4:
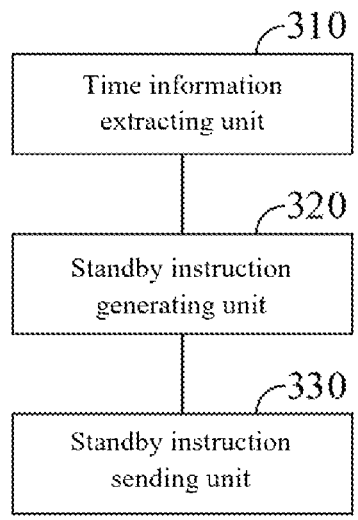
FIG. 4 is a structural schematic diagram of a standby instruction module according to an embodiment of the apparatus for controlling a cooking device according to the present disclosure.

Further, FIG. 4 is a schematic structural diagram of the standby instruction module according to an embodiment of the apparatus for controlling the cooking device according to the present disclosure. As shown in FIG. 4, the standby instruction module 300 includes:

a time information extracting unit 310 configured to extract time information of the to-be-cooked food from the to-be-cooked food information, wherein the time information includes production time and shelf life;

a standby instruction generating unit 320 configured to trigger generation of the standby instruction when it is determined according to the time information that the to-be-cooked food has not expired; and a standby instruction sending unit 330 configured to send the standby instruction to the cooking device, so as to bring the cooking device into the standby state.

According to the apparatus for controlling the cooking device, the food information configured to describe the food, such as production date, shelf-life, cooking methods or the like, is obtained by first scanning the coded pattern of the to-be-cooked food. The standby instruction is sent by the standby instruction module when the preset standby condition is met, so as to bring the cooking device into the standby state, which may ensure that the cooking device enters timely the standby state after the to-be-cooked food is scanned, so as to be prepared for any cooking operation at all time. Then, when the preset cooking condition is met, the cooking instruction is sent by the cooking instruction module, and the cooking device performs food cooking automatically according to the relevant preparation method. At last, the state information, returned from the cooking device and configured to describe the cooking state of the cooking device, is received by the state information module, thereby realizing the control of the cooking device. The method for controlling the cooking device can control the cooking device conveniently and intelligently, so that the cooking device may intelligently complete any cooking operation without being manually assisted near the cooking device, thereby effectively improving the working efficiency of the cooking device.

Figure 5:
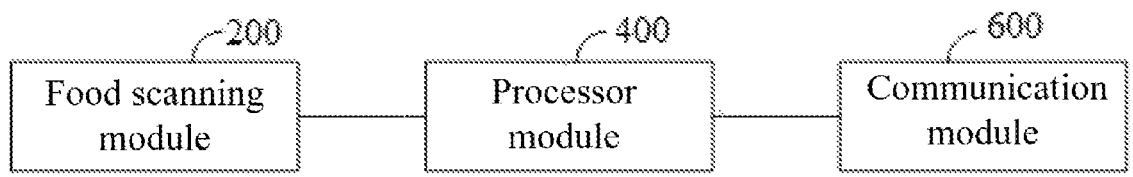
FIG. 5 is a structural schematic diagram according to another embodiment of the apparatus for controlling a cooking device according to the present disclosure.

FIG. 5 is a structural schematic diagram according to another embodiment of the apparatus for controlling a cooking device according to the present disclosure. The apparatus for controlling the cooking device may be implemented by a terminal device such as mobile phone, notebook, tablet, POS machine, in-vehicle computer, or the like. As shown in FIG. 5, an apparatus for controlling the cooking device includes: a food scanning module 200 configured to scan a coded pattern preset on the to-be-cooked food, to obtain the to-be-cooked food information characterizing the to-be-cooked food; a processor module 400 configured to receive the to-be-cooked food information and an external control signal to output a control instruction according to the to-be-cooked food information and the external control signal; and a communication module 600 configured to send the control instruction to the cooking device and receive state information fed back by the cooking device and configured to characterize the cooking state.

The processor module 400 is respectively connected to the food scanning module 200 and the communication module 400.

The food scanning module may be at least one of a laser scanning module and a red light scanning module. The food scanning module 200 may be a scanner, a scanning spear, or a scanning module included in the terminal device.

The to-be-cooked food refers to the food needing to be cooked. Specifically, it may be raw food needing to be cooked, cooked food needing to be warmed, or food or beverage materials needing to be prepared.

The coded pattern refers to various coded patterns printed on food packaging bags. The coded pattern stores relevant information configured to describe the to-be-cooked food, such as origin, producer, production date, shelf life and other information, and may further include cooking methods, a number of times of available cooking, operable time and other information. The coded pattern may also store a link of the relevant information configured to describe the to-be-cooked food. The link may be opened by scanning the coded pattern in order to obtain the relevant food information. In general, the coded pattern has uniqueness. Specifically, the coded pattern may be a bar code, a QR code or the like. In this embodiment, the coded pattern is a unique coded pattern corresponding to any to-be-cooked food, that is, each to-be-cooked food has a unique coded pattern.

A one-dimensional bar code, also known as a bar code, is a graphic identifier that expresses a set of information by arranging a plurality of black bars and white gaps, having different widths, according to a certain encoding rule. The bar code may store a lot of information, such as production country, producer, product name, production date, category, expiration date, and the like for the item.

A QR code, also known as a two-dimensional bar code, may be considered as an upgrade of the bar code. It is a graphic with interlaced black and white distributed on a plane (in a two-dimensional direction) in a certain rule using specific geometries. It is capable of "encoding" relative information, such as text, images, audios, videos and the like, into a graphic. Such information will be displayed, when shooting to scan the graphic. The to-be-cooked food information stored in the coded pattern is configured to characterize the to-be-cooked food. Specifically, it may include origin, producer, production date, shelf life, cooking methods or other information. The food information characterizing the to-be-cooked food may be obtained by scanning the coded pattern preset on the to-be-cooked food via the food scanning module 200.

The processor module 400 receives the external control signal and the to-be-cooked food information obtained by scanning via the food scanning module 200, and outputs the corresponding control instruction after processing by the processor module 400 to implement the corresponding control on the working state of the cooking device. The processor module 400 may include an external control receiving module, such as various trigger switches, configured to receive the external control signal. The external control signal may be, for example, a corresponding signal triggered by clicking a related button on the user interface by the user. Further, the processor module 400 may further include a working state control processor that is triggered according to an output of the external control receiving module to generate a corresponding working state instruction. The working state control processor may be a microprocessor, such as various single-chip microcomputers.

The control instruction, such as the standby instruction for controlling the cooking device to enter the standby state or the cooking instruction for controlling the cooking device to enter the cooking state, may control the working state of the cooking device. Generally, the cooking device has a plurality of working states, such as the standby state, the cooking state or the like. In practical applications, the cooking state may further include cooking parameters, such as cooking mode, cooking flame mode, cooking duration and the like. Specifically, the cooking modes may include cooking operations such as deep-frying, boiling, stir-frying, frying, stewing, braising and roasting, and may also include preparation operations such as brewing, soaking and stirring. Furthermore, the stir-frying may include raw stir-frying, ripe stir-frying, slick stir-frying, plain stir-frying, dry stir-frying, braising stir-frying, soft stir-frying, and the like. The deep-frying may include plain deep-frying, dry deep-frying, soft deep-frying, braising deep-frying, bread-crumb deep-frying, paper wrapping deep-frying, crispy deep-frying, oil drenching deep-frying and the like. The operating user may trigger different control instructions by selecting to make the cooking device to perform the corresponding operation. For example, when selecting the cooking state instruction of "raw stir-frying for 5 minutes with big flame", the cooking device performs the corresponding cooking operation after receiving the corresponding control instruction to cook the food.

Further, the processor module 400, by using the communication module 600, may further receive and perform statistics for the state information that is fed back by the cooking device and characterizes the cooking state, wherein the state information is configured to characterize the cooking state of the cooking device. For example, the state information may include information describing the cooking progress, the to-be-cooked food, the cooking device, and the like, so that the operating user knows the working state of the device timely.

The communication module 600 sends the control instruction generated by the processor module 400 to the cooking device, and receives the state information that characterizes the cooking state and is fed back by the cooking device. The relevant control instruction generated by the processor module 400 is sent by the communication module 600 to the cooking device to implement the control of the cooking device. The cooking device may be a general household cooking device such as oven, steamer oven, microwave oven, electric steamer, electric rice cooker or the like, or may also be a preparation device such as coffee machine, blender, juicer, tea maker or the like, or may also be a comprehensive food processing machine. It may process not only food but also beverages. After the cooking device receives the control instruction and performs the corresponding operation, the communication module 600 receives the state information that characterizes the cooking state and is fed back by the cooking device, and sends the state information to the processor module 400 to perform statistics and to display, so that the user can know the working state of the cooking device timely.

Further, in addition to sending the state information, that characterizes the cooking state and is fed back by the cooking device, to the processor module 400 of the apparatus for controlling the cooking device, the communication module 600 may further relay the state information to another processor, such as a dedicated server, to perform the statistics for the state information, so as to obtain the state information of the cooking device in a larger amount of data.

The apparatus for controlling the cooking device scans the coded pattern preset on the to-be-cooked food package by means of the food scanning module, to obtain the food information describing the food, such as production date, shelf life, cooking methods, or the like. The corresponding control instruction, such as the control instruction that controls the cooking device to enter the standby mode or perform the cooking work, is output by the processor module. At last, the control instruction is sent by the communication module to the cooking device to control the cooking device to work, and the state information fed back by the cooking device is received by the communication module, so as to obtain the cooking state of the cooking device. The apparatus for controlling the cooking device is simple and reasonable in structure, convenient in operation, and can control the cooking device conveniently and intelligently, so that the cooking device may intelligently complete the cooking operation without being manually assisted near the cooking device, thereby effectively improving the working efficiency of the cooking device.

The food scanning module includes at least one of a laser scanning module and a red light scanning module. The food scanning module 200 includes a scanner, a scanning spear, or a scanning module included in the terminal device. The scanner, scanner spear, and scanning module included in the terminal device may scan the coded pattern, and parse the coded pattern to obtain the to-be-cooked food information characterizing the to-be-cooked food. The to-be-cooked food information includes the origin of the to-be-cooked food, producer, production date, shelf life, cooking methods and other relevant information. Therefore, according to the to-be-cooked food information obtained by scanning, it may be determined whether the scanned food has expired according to the production date and shelf life or not. If it has not expired, the food is normally edible.

Figure 6:
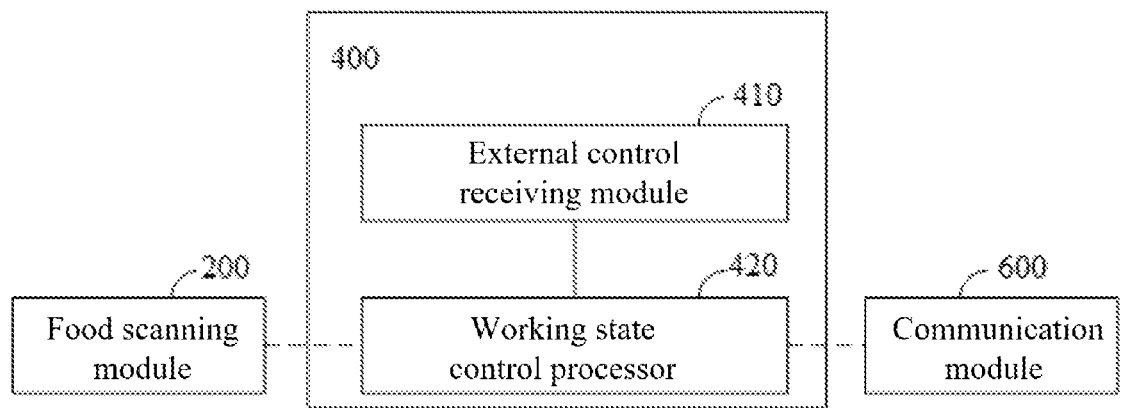
FIG. 6 is a structural schematic diagram of the processor module according to the other embodiment of the apparatus for controlling the cooking device according to the present disclosure.

FIG. 6 is a structural schematic diagram of the processor module according to the other embodiment of the apparatus for controlling the cooking device according to the present disclosure. As shown in FIG. 6, the processor module 400 includes an external control receiving module 410 and a working state control processor 420. The external control receiving module 410 is configured to receive the external control signal. The working state control processor 420 is configured to receive the cooking food information and the output of the external control receiving module which corresponds to a working state instruction.

The working state control processor 420 is respectively connected to the external control receiving module 410, the food scanning module 200, and the communication module 600.

The external control receiving module 410 may be a switch circuit configured to receive the external control signal. The operating user controls the working state control processor 420 to select which control instruction is to generate. The working state control processor 420 includes a microprocessor, and is respectively connected to the external control receiving module 410, the food scanning module 200, and the communication module 600. The microprocessor triggers the generation of the corresponding control instruction according to the received external control signal and the received to-be-cooked food information obtained by scanning via the food scanning module 200, and sends the generated control instruction to the communication module 600. The control instruction is sent to the cooking device via the communication module 600, so as to realize the control of the working state of the cooking device.

In an embodiment, the external control receiving module 410 includes a switch circuit. The switch circuit includes transistor switch circuit, potentiometer circuit, or the like. Different control signals, which correspond to the control instructions of different operating states of the cooking device, may be input via the switch circuit by selecting.

In an embodiment, the external control receiving module 410 includes at least one of a slide switch, a toggle switch, a snap switch, a button switch, a key switch, and a thin film switch. The external control receiving module may be formed directly by a plurality of switches. Different control signals may be selected to input via switch combinations, which correspond to the control instructions of the different working states of cooking device.

In an embodiment, the working state control processor 420 includes a single-chip microcomputer. The working state control processor 420 receives the cooking food information obtained by scanning via the food scanning module 200 and the output of the external control receiving module 410, and outputs the corresponding working state instruction. The working state control processor 420 may be a microprocessor, such as a single-chip microcomputer. In this application, the type of single-chip microcomputer is not limited, and it is required only that the single-chip microcomputer may output the corresponding control instruction.

In an embodiment, the processor module 400 further includes an alarm module. The alarm module is respectively connected to the external control receiving module 410, the working state control processor 420, and the communication module 600, so that the working of each module may be monitored in real time, so as to alarm when an abnormal operation occurs in a module. In practical applications, the alarm module includes an electrical parameter monitoring circuit and an indicating circuit. The electric parameter monitoring circuit may be a current detecting circuit or a voltage detecting circuit, which detects the current or voltage of each module in real time. When the current or the voltage is too high, the indicating circuit alarms. Specifically, the indicating circuit may be a buzzer or LED indicator. When a module circuit is abnormal, the buzzer sounds or the LED indicator flashes to alarm. By monitoring the working state of each module in real time via the alarm module, the alarm may be sent out timely when the device is abnormal, to indicate the abnormality, which facilitates a quick check of problems, is benefit to improve the safety of the apparatus.

In an embodiment, the communication module 600 may be a wired communication module or a wireless communication module. Specifically, the communication module 600 may include at least one of a twisted pair, a coaxial cable, an optical fiber, a Wi-Fi communication module, a Bluetooth communication module, a Zigbee communication module, a 3G communication module, a 4G communication module, and a 5G communication module. The communication module 600 sends the control instruction generated by the processor module 400 to the cooking device, and receives the state information that characterizes the cooking state and is fed back by the cooking device. The status information is configured to characterize the cooking state of the cooking device. For example, it may include the information describing the cooking progress, the to-be-cooked food, the cooking device, or the like.

In an embodiment, the apparatus for controlling the cooking device further includes a display respectively connected to the food scanning module 200, the processor module 400, and the communication module 600, so that the scanning result of the food scanning module 200, the working situation of the processor module 400, and the signal receiving and sending situation of the communication module 600 may be displayed in real time, so as to facilitate operating the visualization operation of the user.

In an embodiment, the apparatus for controlling the cooking device further includes a power supply connected to the food scanning module 200, the processor module 400, the communication module 600, and the display, respectively. The power supply supplies power to each functional module to drive each module to work properly.

The apparatus for controlling the cooking device is simple and reasonable in structure, convenient in operation, and can control the cooking device conveniently and intelligently, so that the cooking device may intelligently complete the cooking operation without being manually assisted near the cooking device, thereby effectively improving the working efficiency of the cooking device.

In addition, corresponding to the foregoing method and apparatus for controlling the cooking device, the present disclosure further provides a computer readable storage medium. In an embodiment, the computer readable storage medium stores a computer program, and when the computer program is executed by a processor, the processor performs the steps of the method for controlling the cooking device as described above. The computer storage medium may be a magnetic disk, an optical disc, a read-only memory (ROM), a random access memory (RAM), or the like.

In addition, corresponding to the foregoing method, device, apparatus and computer readable storage medium for controlling a cooking, the present disclosure further provides a computer device. In an embodiment, the computer device includes a memory and a processor. The memory stores a computer program thereon. When the computer program is executed by the processor, the processor performs the steps of the method for controlling the cooking device as described above.

The computer device, when its processor executes the program, obtains the food information for describing the food, such as production date, shelf-life, cooking methods or the like, by first scanning the coded pattern of the to-be-cooked food, by implementing any of the methods for controlling the cooking device in the foregoing embodiments. When the preset standby condition is met, the standby instruction is sent, so as to bring the cooking device into the standby state, which may ensure that the cooking device enters timely the standby state after the to-be-cooked food is scanned, so as to be prepared for any cooking operation at all time. then, when the preset cooking condition is met, the cooking instruction is sent, and the cooking device performs food cooking automatically according to the relevant preparation method; finally, the state information, returned from the cooking device and configured to describe the cooking state of the cooking device, is received, thereby realizing the control to the cooking device. The method, apparatus, computer device and storage medium for controlling the above-mentioned cooking device can control the cooking device conveniently and intelligently, so that the cooking device may intelligently complete any cooking operation without being manually assisted near the cooking device, thereby effectively improving the working efficiency of the cooking device.

In addition, a person of ordinary skill in the art may understand that the implementation of all or part of the processes in the methods of the foregoing embodiments may be accomplished by instructing relevant hardware with a computer program that may be stored in a non-volatile computer readable storage medium. For example, in the embodiments of this application, the program may be stored in a storage medium of a computer system and executed by at least one processor in the computer system to implement the processes including the embodiments of the methods for controlling the cooking device as described above.

All the technical features in the embodiments can be employed in arbitrary combinations. For purpose of simplifying the description, not all arbitrary combinations of the technical features in the embodiments illustrated above are described. However, as long as such combinations of the technical features are not contradictory, they should be considered as within the scope of the disclosure in the specification.

The above embodiments are merely illustrative of several implementations of the disclosure, and the description thereof is more specific and detailed, but should not be deemed as limitations to the scope of the present disclosure. It should be noted that variations and improvements will become apparent to those skilled in the art to which the present disclosure pertains without departing from its scope. Therefore, the scope of the present disclosure is defined by the appended claims.

What is claimed is:

1. A method for controlling a cooking device, the method comprising:

scanning a coded pattern preset on a to-be-cooked food to obtain to-be-cooked food information characterizing the to-be-cooked food;

sending a standby instruction to the cooking device when the to-be-cooked food information meets a preset standby condition, so as to bring the cooking device into a standby state, wherein the preset standby condition is that the to-be-cooked food is still in the shelf life;

sending a cooking instruction to the cooking device when the cooking device is in the standby state and the preset cooking condition is met, so as to control the cooking device to cook the to-be-cooked food; and receiving state information fed back by the cooking device, wherein the state information is configured to characterize a cooking state of the cooking device;

wherein the act of sending the cooking instruction to the cooking device when the cooking device is in the standby state and the preset cooking condition is met, so as to control the cooking device to cook the to-be-cooked food, comprises:

receiving an external cooking control signal to trigger generation of the cooking instruction, wherein the cooking instruction comprises a number of times of available cooking and an operable duration corresponding to the to-be-cooked food;

obtaining a cooking record list of the to-be-cooked food, wherein the cooking record list comprises a historical cooking time of the to-be-cooked food;

obtaining a number of times of historical cooking and an operable time according to the operable duration and the historical cooking time;

sending the cooking instruction to the cooking device when the number of times of historical cooking is less than the number of times of available cooking and a present time does not exceed the operable time, so as to control the cooking device to cook the to-be-cooked food;

wherein the standby state refers to a state in which the cooking device is powered on but does not perform any substantive work; and the act of receiving state information fed back by the cooking device is performed after the cooking instruction is sent to the cooking device, so as to control the cooking device to cook the to-be-cooked food.

2. The method for controlling the cooking device of claim 1, wherein the step of sending the standby instruction to the cooking device when the to-be-cooked food information meets the preset standby condition, so as to bring the cooking device into the standby state, comprises:

extracting time information of the to-be-cooked food from the to-be-cooked food information, wherein the time information comprises production time and shelf life;

triggering generation of the standby instruction when it is determined according to the time information that the to-be-cooked food has not expired; and sending the standby instruction to the cooking device, so as to bring the cooking device into the standby state.

3. The method for controlling the cooking device of claim 1, wherein after the step of sending the standby instruction to the cooking device, so as to bring the cooking device into the standby state, the method further comprises:

disabling sending the standby instruction to the cooking device when a record of the standby instruction corresponding to the coded pattern sent to the cooking device exists in a history record.

4. The method for controlling the cooking device of claim 1, wherein after the step of scanning the coded pattern preset on the to-be-cooked food to obtain the to-be-cooked food information characterizing the to-be-cooked food, the method comprises:

recording a scanning time for scanning the coded pattern of the to-be-cooked food;

extracting time information of the to-be-cooked food from the to-be-cooked food information, wherein the time information comprises production time and shelf life; and comparing the scanning time with the time information, and sending a food expiration warning message when the to-be-cooked food has expired.

5. The method for controlling the cooking device of claim 1, wherein after the step of receiving the state information fed back by the cooking device, wherein the state information is configured to characterize the cooking state of the cooking device, the method further comprises:

recording the state information in recording information, wherein the recording information comprises operation recording information of the cooking device and cooking recording information of the to-be-cooked food.

6. A computer readable non-transitory storage medium having a computer program stored thereon, wherein when the computer program is executed by a processor, the processor performs the steps of the method of claim 1.

7. A computer device comprising a processor and a memory having a computer program stored therein, wherein when the computer program is executed by the processor, the processor performs the steps of the method of claim 1.

8. An apparatus for controlling a cooking device, wherein the apparatus comprises:

a food scanner configured to scan a coded pattern preset on a to-be-cooked food to obtain to-be-cooked food information characterizing the to-be-cooked food;

a processor configured to receive the to-be-cooked food information and an external control signal, so as to output a control instruction according to the to-be-cooked food information and the external control signal, wherein the control instruction comprises a standby instruction configured to control the cooking device into a standby state and a cooking instruction configured to control the cooking device into the cooking state, wherein the preset standby condition is that the to-be-cooked food is still in the shelf life;

wherein the processor is further configured to output the standby instruction when the to-be-cooked food information meets the preset standby condition, so as to control the cooking device into the standby state; and configured to output the cooking instruction when the cooking device is in the standby state and the preset cooking condition is met, so as to control the cooking device into the cooking state; and a communication device configured to send the control instruction to the cooking device and receive state information fed back by the cooking device and configured to characterize a cooking state;

wherein the processor is respectively connected to the food scanner and the communication device;

the processor comprises:

an external control receiver configured to receive the external control signal; and a working state control processor configured to receive the cooking food information and an output of the external control receiver, and output a corresponding working state instruction;

Wherein the working state control processor is configured to:

obtain a cooking record list of the to-be-cooked food, wherein the cooking record list comprises a historical cooking time of the to-be-cooked food;

obtain a number of times of historical cooking and an operable time according to the operable duration and the historical cooking time;

and send the cooking instruction to the cooking device when the number of times of historical cooking is less than the number of times of available cooking and a present time does not exceed the operable time, so as to control the cooking device to cook the to-be-cooked food;

wherein the working state control processor is respectively connected to the external control receiver, the food scanner and the communication device;

wherein the standby state refers to a state in which the cooking device is powered on but does not perform any substantive work; and state information fed back by the cooking device is received after the cooking instruction is sent to the cooking device, so as to control the cooking device to cook the to-be-cooked food.

9. The apparatus for controlling the cooking device of claim 8, wherein the food scanner comprises at least one of a laser scanner and a red light scanner.

10. The apparatus for controlling the cooking device of claim 8, wherein the external control receiver comprises a switch circuit, and the switch circuit comprises at least one of a slide switch, a toggle switch, a snap switch, a button switch, a key switch, and a thin film switch.

11. The apparatus for controlling the cooking device of claim 8, wherein the working state control processor comprises a single-chip microcomputer.

12. The apparatus for controlling the cooking device of claim 8, wherein the processor further comprises an alarm, and the alarm is respectively connected to the external control receiver, the working state control processor and the communication device.

13. The apparatus for controlling the cooking device of claim 8, wherein the communication device comprises at least one of a twisted pair, a coaxial cable, an optical fiber, a Wi-Fi communication device, a Bluetooth communication device, a Zigbee communication device, a 3G communication device, a 4G communication device, and a 5G communication device.

14. The apparatus for controlling the cooking device of claim 8, wherein the apparatus further comprises a display, and the display is respectively connected to the food scanner, the processor and the communication device.

15. The apparatus for controlling the cooking device of claim 8, wherein the apparatus further comprises a power supply, and the power supply is respectively connected to the food scanner, the processor and the communication device.

* * * * *